(12) United States Patent
Katehis

(10) Patent No.: US 6,514,406 B1
(45) Date of Patent: Feb. 4, 2003

(54) WATER TREATMENT APPARATUS

(76) Inventor: James E. Katehis, P.O. Box 610130, Bayside, NY (US) 11361

(*) Notice: Subject to any disclaimer, the term of this patent is extended or adjusted under 35 U.S.C. 154(b) by 110 days.

(21) Appl. No.: 09/695,648

(22) Filed: Oct. 24, 2000

(51) Int. Cl.⁷ .................... B01D 35/06; C02F 1/48; C02F 1/461
(52) U.S. Cl. .............. 210/175; 210/222; 210/223; 210/243; 210/252; 210/259; 210/497.01; 202/182; 202/185.3; 204/275.1; 204/660; 204/664; 204/665; 204/666; 204/DIG. 5
(58) Field of Search ................ 210/175, 222, 210/182, 223, 243, 252, 259, 294, 295, 497.01; 204/275.1, 660, 664, 665, 666, DIG. 5; 202/182, 185.3

(56) References Cited

U.S. PATENT DOCUMENTS

| | | |
|---|---|---|
| 4,252,616 A | 2/1981 | Glazer |
| 4,518,503 A | 5/1985 | Fermaglich |
| 4,622,102 A | 11/1986 | Diebel |
| 4,948,499 A | 8/1990 | Peranio |
| 5,139,676 A | 8/1992 | Ebisawa et al. |
| 5,203,970 A | 4/1993 | Ellis, Jr. |
| 5,281,309 A | 1/1994 | Greene |
| 5,575,904 A | 11/1996 | Suzuki |
| 5,833,812 A | 11/1998 | Hartman |
| 5,938,900 A | 8/1999 | Reynolds |

*Primary Examiner*—David A. Reifsnyder
(74) *Attorney, Agent, or Firm*—Dale J. Ream (57) ABSTRACT

A water treatment apparatus comprises a first housing having an inlet, an outlet, and a chamber defined therebetween wherein the inlet is connected to an upstream water pipe. A series of magnets are arranged for attachment about the upstream water pipe for directing a magnetic field onto water flowing downstream into the first housing chamber. First and second electrodes of a copper and silver alloy are positioned in the first housing chamber for releasing copper and silver ions into the water therein to reduce bacteria levels of the water. A heating coil is disposed in the first housing for boiling the water in the first housing chamber. The apparatus includes a second housing having an inlet, an outlet, and a chamber defined therebetween. A conduit connects the outlet of the first housing with the inlet of the second housing for supplying water vapor from the first housing chamber to the second housing chamber. A funnel and a fan are positioned in the second housing chamber for condensing the water vapor into distilled water. The distilled water is funneled into a helical filter for producing filtered distilled water. The filtered water is supplied to a third housing for storage, the storage reservoir being connected to an outlet fluid pipe for supplying the filtered water to a faucet.

11 Claims, 6 Drawing Sheets

WATER TREATMENT APPARATUS

BACKGROUND OF THE INVENTION

This invention relates generally to fluid treatment apparatus and, more particularly, to an apparatus that treats water through magnetization, ionization, distillation, and filtration.

Untreated water can cause a variety of problems to a homeowner's water pipes or to a person who ingests it. Although water initially treated at a city's water treatment facility is generally potable, it may not achieve the level of purity desired by many individuals. In addition, mineral deposits which precipitate out of a water stream can cause undesirable scaling within water pipes.

Various methods and devices have been proposed in the prior art to purify water or reduce the problem of scaling. In U.S. Pat. No. 5,938,900, a system is proposed for magnetically treating water so as to maintain important metals in a flowing water stream. That system further treats a water stream by depositing certain metal ions into the water to destroy algae and bacteria. Although assumably effective for their intended, purposes, existing systems do not include the very effective water treatment procedures of distillation and filtration.

Therefore, it is desirable to have a water treatment apparatus which distills a water stream through boiling and condensation as well as treating the water stream magnetically or through ionization. Further, it is desirable to have an apparatus which efficiently filters the treated water following the distillation process.

SUMMARY OF THE INVENTION

A water treatment apparatus according to the present invention includes a first housing defining an inlet, an outlet, with a chamber therebetween. The inlet is connected to an upstream fluid pipe for supplying a water stream into the first housing chamber. A plurality of polarizing magnets are attached to the upstream fluid pipe for directing a magnetic field onto water flowing downstream through the upstream fluid pipe and into the first housing chamber. Magnetization gives the water molecules an ionic charge that is greater than the ionic charge of the mineral molecules dissolved therein, thus creating a natural magnetic attraction between the water molecules and minerals therein. The magnetic charge imparted to the water stream preserves essential minerals from crystallizing into hard rock scale within the upstream fluid pipe.

The first housing chamber further includes a pair of copper/silver electrodes. A small electrical voltage is alternately passed between the two electrodes, causing copper and silver ions to be deposited into the water in the first housing chamber. Copper ions are introduced into the water as they are known to destroy all species of algae and are presently used to control algae in lakes and reservoirs. Similarly, silver ions have unique antimicrobial properties that destroy bacteria and viruses. Accordingly, silver nitrate is commonly used in medicines to prevent infection. The consumption of copper and silver ions is safe for human consumption, even at levels far in excess of levels contemplated for home water treatment.

The first housing also includes a heating coil for boiling the water in the first housing chamber. A conduit connects the outlet of the first housing with an inlet of a second housing for supplying water vapor from the first housing chamber to a second housing chamber. The second housing chamber includes a condenser assembly having a funnel and an electric fan. Air from the fan cools the funnel and causes the water vapor to condense thereon. The water drains through the funnel and is deposited into a helical filter. Following filtration, the filtered and distilled water is communicated through another conduit to a storage chamber defined by a third housing. The storage chamber is connected via a downstream fluid pipe to a faucet or other outlet fixture.

Therefore, a general object of the present invention is to provide a water treatment apparatus which magnetically polarizes water molecules to prevent beneficial minerals dissolved in water from crystallizing into hard rock scale within a water pipe.

Another object of this invention is to provide an apparatus, as aforesaid, which ionizes a water stream with copper and silver ions to destroy algae, bacteria, and viruses contained therein by electrically stimulating copper/silver alloy electrodes.

Still another object of this invention is to provide an apparatus, as aforesaid, which allows a user to adjust the rate at which copper and silver ions are released into the water stream.

Yet another object of this invention is to provide an apparatus, as aforesaid, which is suitable for inline use such as under a sink or, alternatively, in connection with a hot water tank to service an entire house or building.

A further object of this invention is to provide an apparatus, as aforesaid, which distills a water stream by first boiling and then condensing the water stream.

A still further object of this invention is to provide an apparatus, as aforesaid, which efficiently filters distilled water with a helical filter so as to collect any impurities which may be introduced during the magnetization or ionization processes.

A particular object of this invention is to provide an apparatus, as aforesaid, which does not require the addition of chemicals or require significant maintenance.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
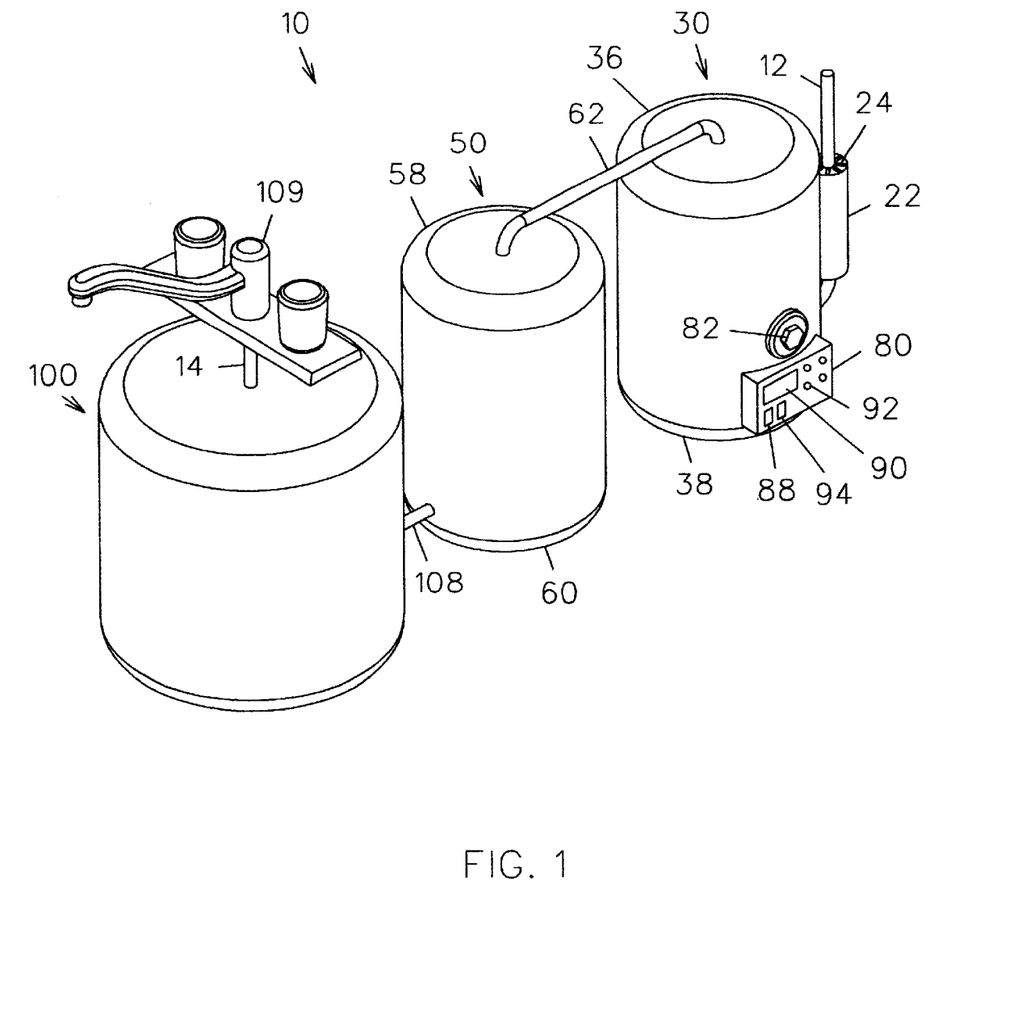
FIG. 1 is a perspective view of a water treatment apparatus according to one embodiment of the present invention.
Figure 2:
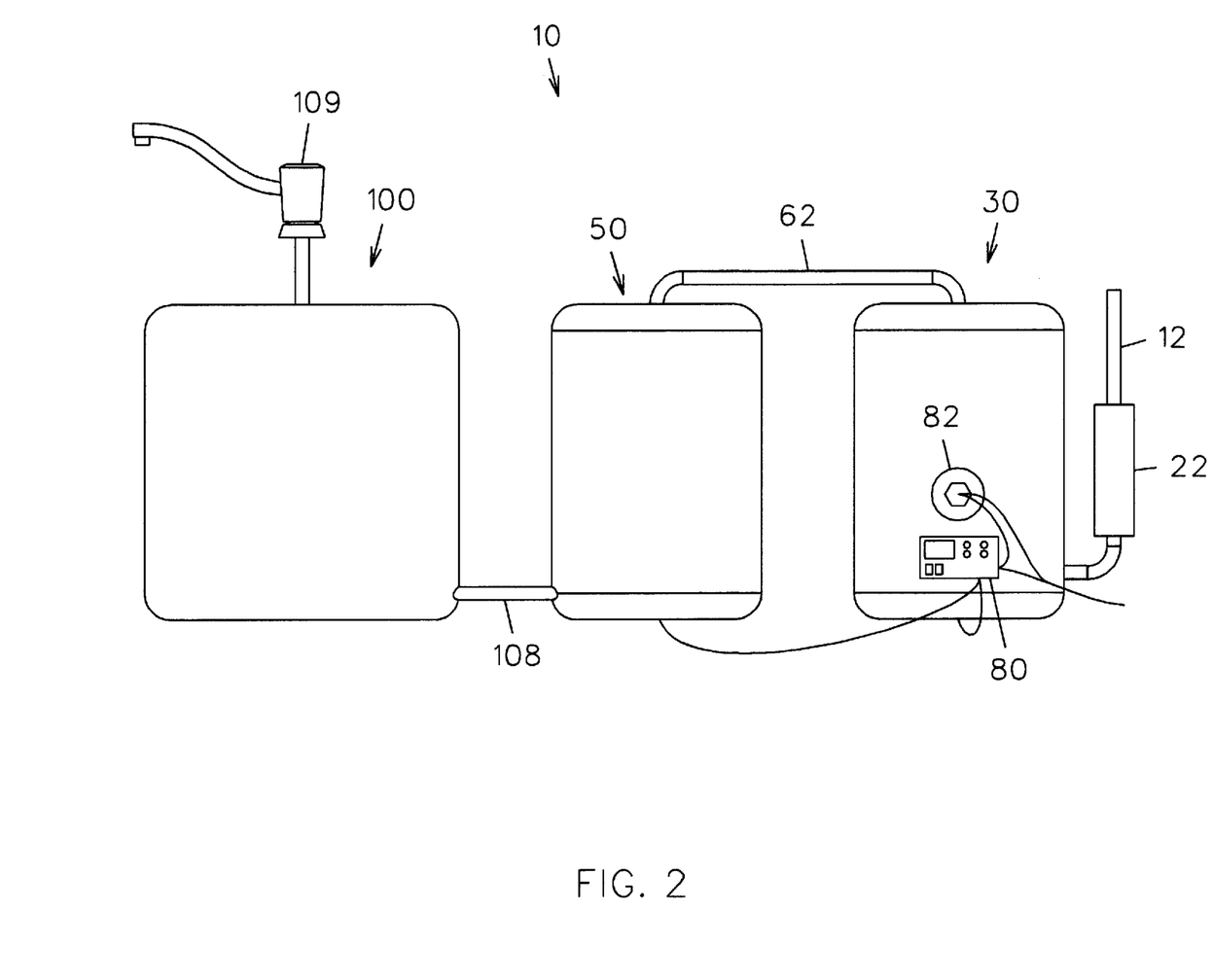
FIG. 2 is a front view of the apparatus as in claim 1 in an inline configuration.
Figure 3:
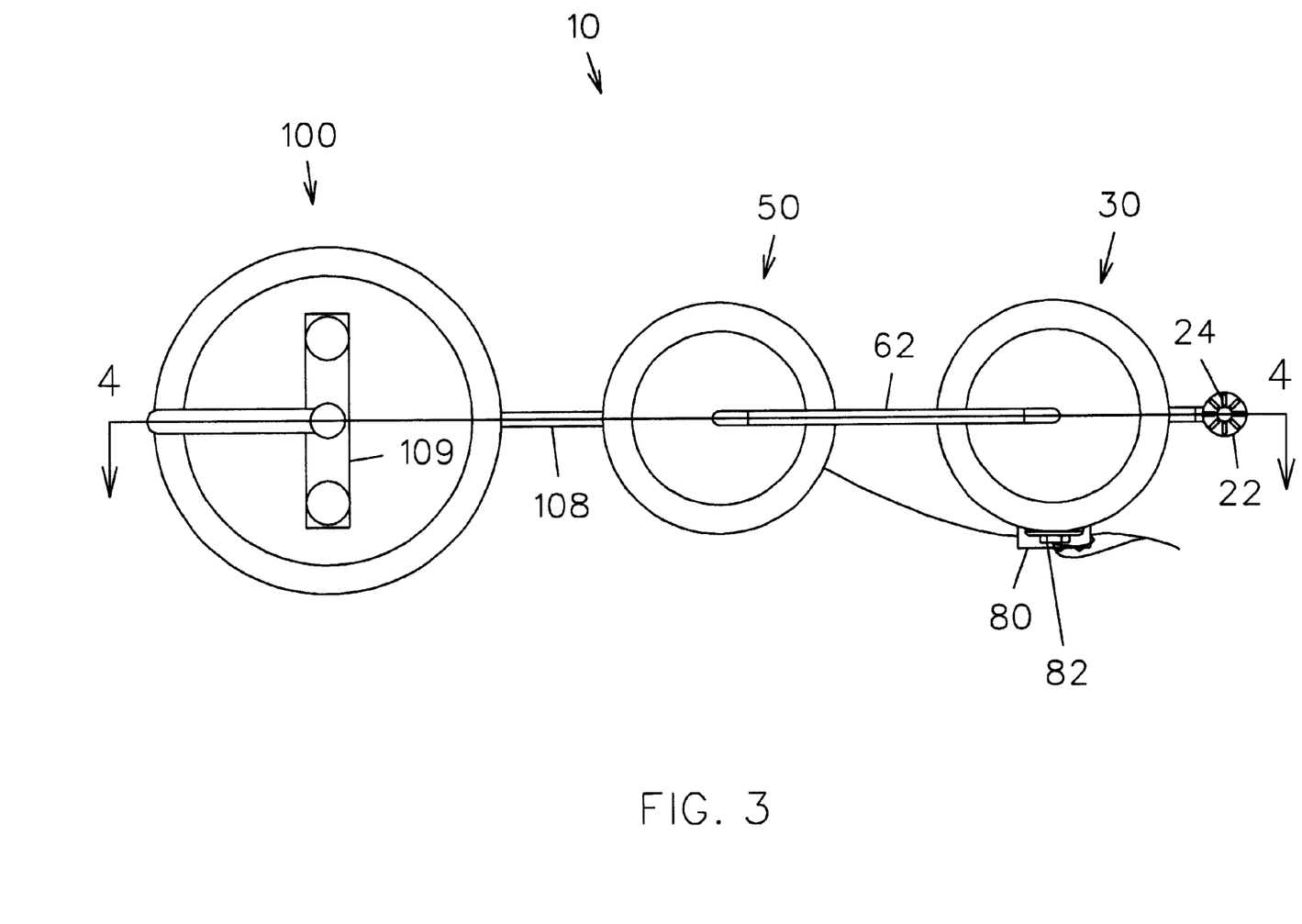
FIG. 3 is a top view of the apparatus as in claim 2.

A water treatment apparatus according to the present invention will now be described with reference to FIGS. 1–6 of the accompanying drawings. A water treatment apparatus 10 according to one embodiment of the present invention includes first 30, second 50, and third 100 housings arranged in an inline configuration and connected to upstream 12 and downstream 14 water pipes (FIG. 1). The first housing 30 includes a cylindrical configuration having an open top and open bottom. The first housing 30 defines an inlet 32 in its side wall. An upper lid 36 having a closed top and an open bottom is configured to be removably mounted to the first housing 30 so as to enclose the open top thereof. The closed top of the upper lid 36 defines an outlet 34. Having a construction substantially similar to the upper lid 36, a lower lid 38 is configured to be removably mounted to the open bottom of the first housing 30 and to enclose the open bottom thereof. The lower lid 38 includes a partition wall 40 which spans the interior diameter thereof. The partition wall 40 is positioned just below the inlet 32 when the lid is attached to the first housing 30 and separates the first housing 30 into upper 42 and lower 44 chambers. The upstream fluid pipe 12 is connected to the inlet 32 for supplying water into the upper chamber 42 upon operation of a valve 16 coupled to the upstream fluid pipe 12 adjacent the inlet 32. The removable lids allow access to inner components of the first housing 30, as to be further described below.

The apparatus 10 includes a casing 22 having a plurality of bar magnets 24 evenly spaced apart in a radial configuration about a central bore (FIG. 1). The casing 22 may be attached about the upstream fluid pipe 12. Each magnet 24 radially extends from a center point of the bore with the south poles being adjacent thereto and thus adjacent the pipe. In function, water molecules passing through the upstream fluid pipe 12 are charged by the magnetic fields formed by the south poles of the bar magnets 24. The charged particles in the water stream flowing through the pipe preclude crust/scale buildup about the inner surface of the pipe and end of the water pipe seated within the inlet 32 of the first housing 30. In other words, the magnetic attraction between the water molecules and essential minerals precludes the minerals dissolved in the water stream from crystallizing into hard rock scale.

Figure 4:
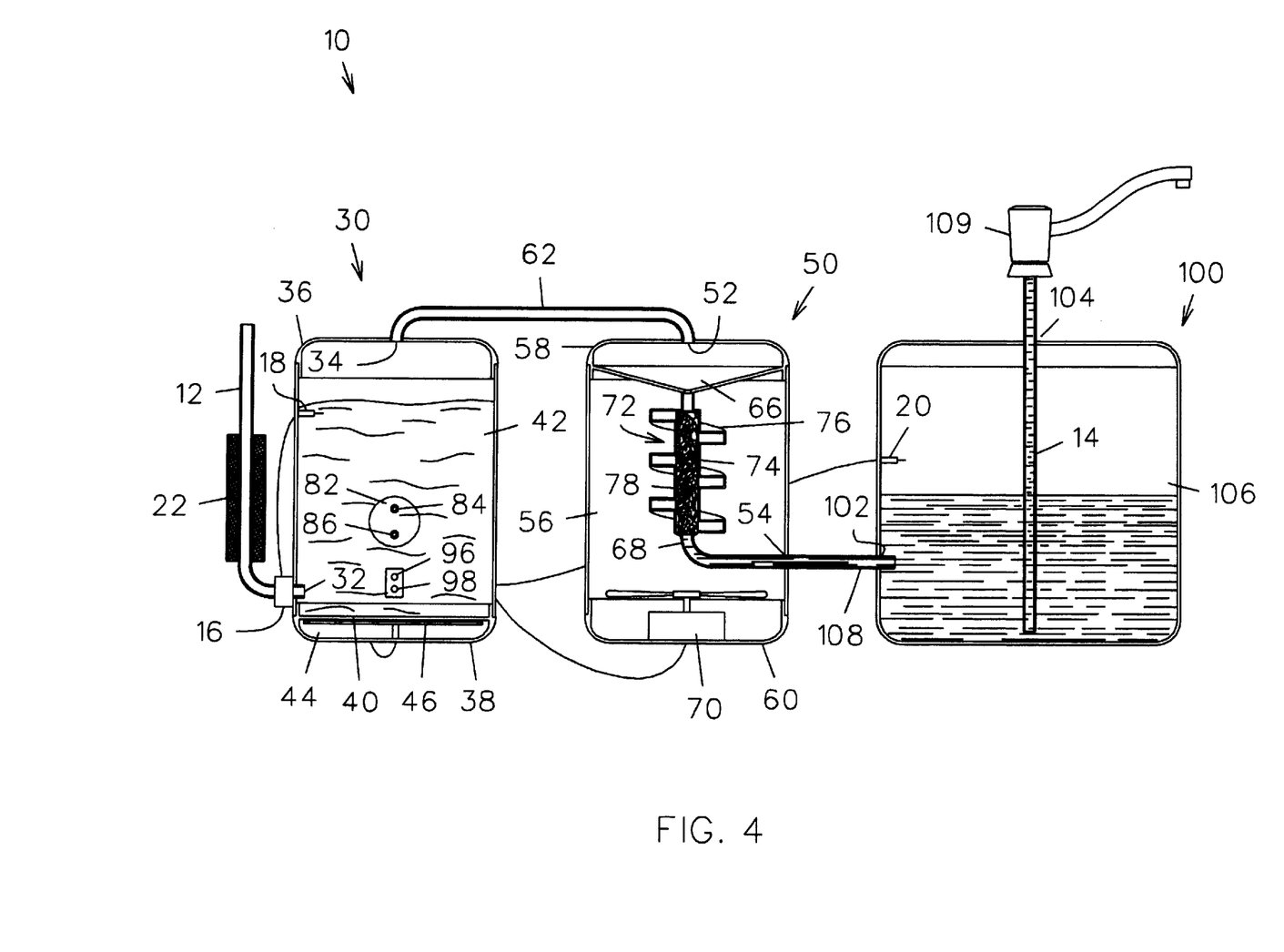
FIG. 4 is a sectional view of the apparatus taken along line 4—4 of FIG. 3.

The upper chamber 42 of the first housing 30 includes a computerized control panel 80 and a cell assembly 82 having first 84 and second 86 electrodes (FIGS. 1 and 4) preferably made of a copper/silver alloy. The control panel 80 includes a power switch 88, digital display 90, status lights 92, and user control buttons 94 for adjusting the rate of ionization. The control panel 80 may also be electrically coupled to a temperature sensor 96 and thermometer 98 positioned within the upper chamber 42 of the first housing 30 for water temperature regulation (FIG. 4). Upon delivery of current to the electrodes 84, 86, copper and silver ions are released into the water at a rate proportional to the delivered current. This water ionization process results in depletion of ions from one electrode and accumulation of the released ions by the other electrode. By alternating electrode polarity, a buildup of scale on the electrodes is avoided. The use of copper ions as an algaecide and silver ions as a bactericide as well as methods for alternatively releasing such ions from the electrodes to a liquid is known.

The water treatment apparatus 10 further includes a heating coil 46 mounted within the lower chamber 44 defined by the lower lid 38, the heating coil being positioned immediately beneath the partition wall 40. When energized, the heating coil 46 causes the water within the upper chamber 42 of the first housing 30 to boil. Water vapor or steam is allowed to escape from the upper chamber 42 through the outlet 34.

The apparatus 10 includes a second housing 50 having a cylindrical configuration and defining an inlet 52, an outlet 54, and a chamber 56 therebetween. Having a construction substantially similar to that of the lids 36, 38 of the first housing 30, the second housing 50 also includes removable upper 58 and lower 60 lids. The upper lid 58 defines the inlet 52. A conduit 62 connects the outlet 34 of the first housing 30 to the inlet 52 of the second housing 50 for supplying water vapor from the upper chamber 42 of the first housing 30 with the second housing chamber 56. The second housing 50 includes a condenser assembly. The condenser assembly includes a funnel 66 depending from the upper lid 58. The funnel 66 includes an open top having a diameter which spans the entire upper lid 58, the funnel tapering to an opposed end 68 of smaller diameter. An electric fan 70 is positioned in the lower lid 60 and, when energized, blows air upward upon the bottom side of the funnel 66. The air cools the funnel 66 and causes the water vapor to condense thereon as distilled water, also referred to as condensate.

A helical filter assembly 72 is positioned in the second housing 50. The filter assembly 72 includes a tube 74, the upper end of which communicates with the smaller opposed end 68 of the funnel 66 when the upper lid 58 is mounted to the second housing 50 (FIG. 4). The filter assembly 72 further includes a helical channel 76 having an inward-facing open side that communicates with a central through-hole of the tube 74, the through-hole being surrounded by spiraling turns of the helical channel 76. A porous mesh-like filter 78 is disposed within the through-hole of the tube 74. In function, distilled water is supplied through the opposed end of the funnel 66 into the upper end of the filter assembly tube 74. The water is filtered as it descends through the mesh-like filter 78. If the filter 78 becomes clogged, the water travels through the channel 76 to a point beyond the clogged area where it once again enters the filter 78 within the through-hole.

The water treatment apparatus 10 includes a third housing 100 which also has a cylindrical configuration and operates as a storage reservoir for the treated water. The third housing 100 defines an inlet 102, an outlet 104, and a chamber 106 therebetween. A conduit 108 connects a lower end of the filter assembly tube 74 with the inlet 102 of the third housing 100 for supplying the filtered water from the filter assembly 72 to the third housing chamber 106. The downstream fluid pipe 14 extends through the outlet 102 and includes an end positioned adjacent a bottom of the third housing 100. An upper end of the downstream fluid pipe 14 may be coupled to a faucet 109 adapted to selectably draw water from the third housing chamber 106.

The water treatment apparatus 10 includes a pair of water level sensors for regulating the flow of water through the apparatus. A first sensor 18 is positioned within the upper chamber 42 of the first housing 30 and is electrically connected to valve 16. In operation, the first sensor causes the valve to open fluid communication between the upstream fluid pipe 12 and the upper chamber 42 when the first sensor 18 senses a water level that is less than a predetermined water level. In other words, water is allowed to flow into the upper chamber 42 when the water level therein falls below the position of the first sensor 18. A second sensor 20 is positioned in the third housing chamber 106 and is electrically connected to the valve 16. The second sensor 20 causes the valve to open fluid communication between the upstream fluid pipe 12 and the upper chamber 42 of the first housing 30 when it senses that the water level is below a predetermined level, i.e. lower than the position of the sensor.

In operation, a water stream flows through the upstream fluid pipe 12, through the valve 16 and inlet 32 into the upper chamber 42 of the first housing 30. The casing 22 of bar magnets 24 coupled to the upstream fluid pipe 12 magnetically charges the water before it reaches the first housing 30 and precludes minerals dissolved therein from crystallizing onto the inner surfaces of the pipe. Once the water stream is in the first housing, it is ionized by operation of the cell assembly 82. The copper and silver electrodes 84, 86 alternately release copper and silver ions into the water for destroying algae, bacteria, and viruses. The water is boiled by the heat of the heating coil 46 and water vapor therefrom is communicated through the conduit 62 into the second housing chamber 56. As the water vapor contacts the funnel and is cooled by air from the fan 70, the vapor condenses and is collected by the funnel 66. The condensed and now distilled water drains through the funnel 66 into the helical filter 78 and is efficiently filtered thereby. The water, having been magnetized, ionized, distilled, and filtered, is supplied to the third housing chamber 106 (storage reservoir) to be drawn through the downstream fluid pipe 14 for use.

Figure 5:
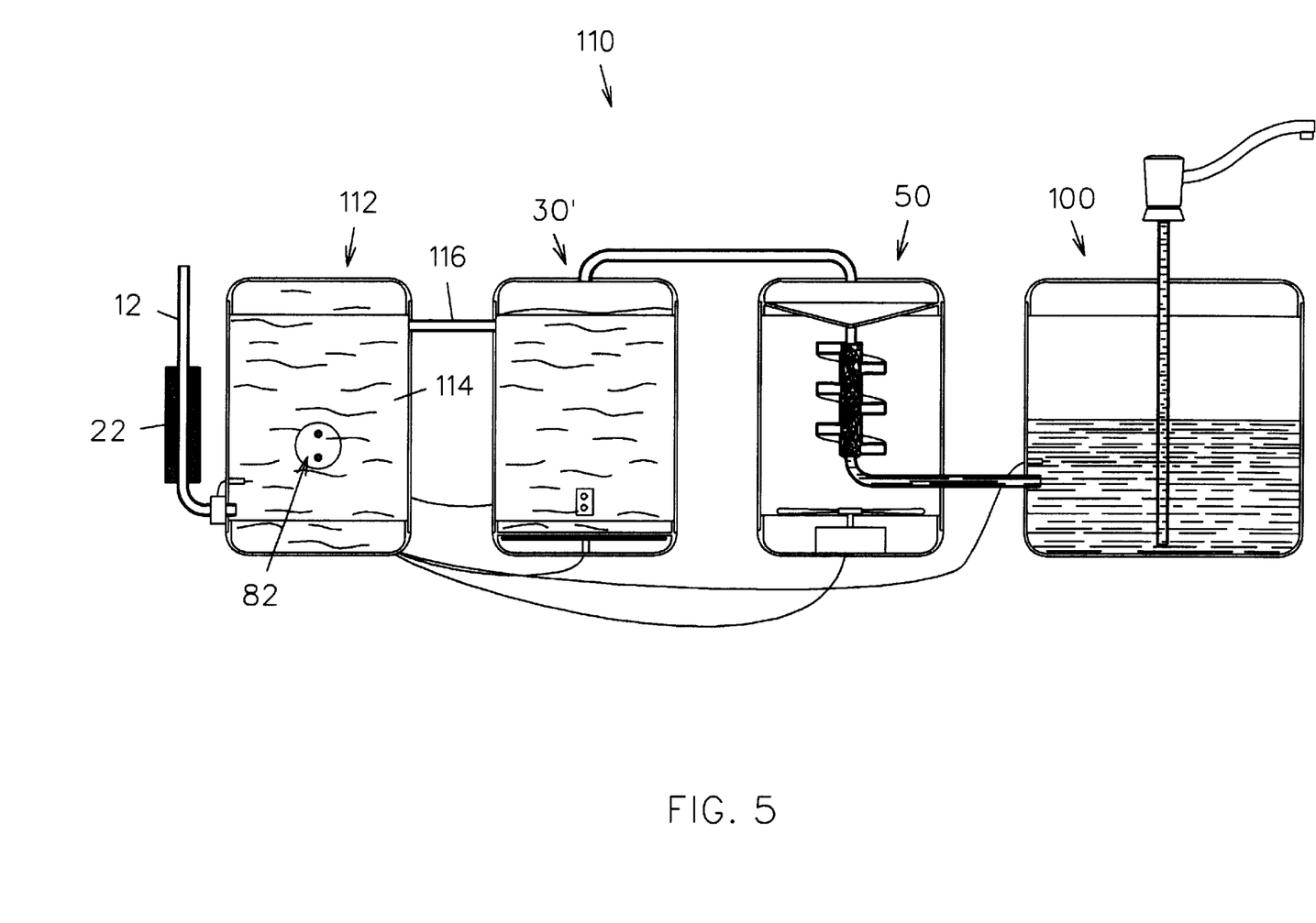
FIG. 5 is an another embodiment of the sectional view of FIG. 4.

Another embodiment of the water treatment apparatus 110 is illustrated in FIG. 5 and is substantially similar to the embodiment described previously except as specifically noted below. In this embodiment, the ionization and boiling of water procedures are accomplished independently in two separate chambers. More particularly, an additional housing 112 is coupled to the upstream fluid pipe 12 and defines a chamber 114. The ionization cell assembly 82 is disposed in this chamber 114. The ionized water is then supplied to the first housing (modified to not include the cell assembly and now referred to with reference number 30') through a conduit 116 for initiation of the distillation process. The remainder of the apparatus is as previously described.

Figure 6:
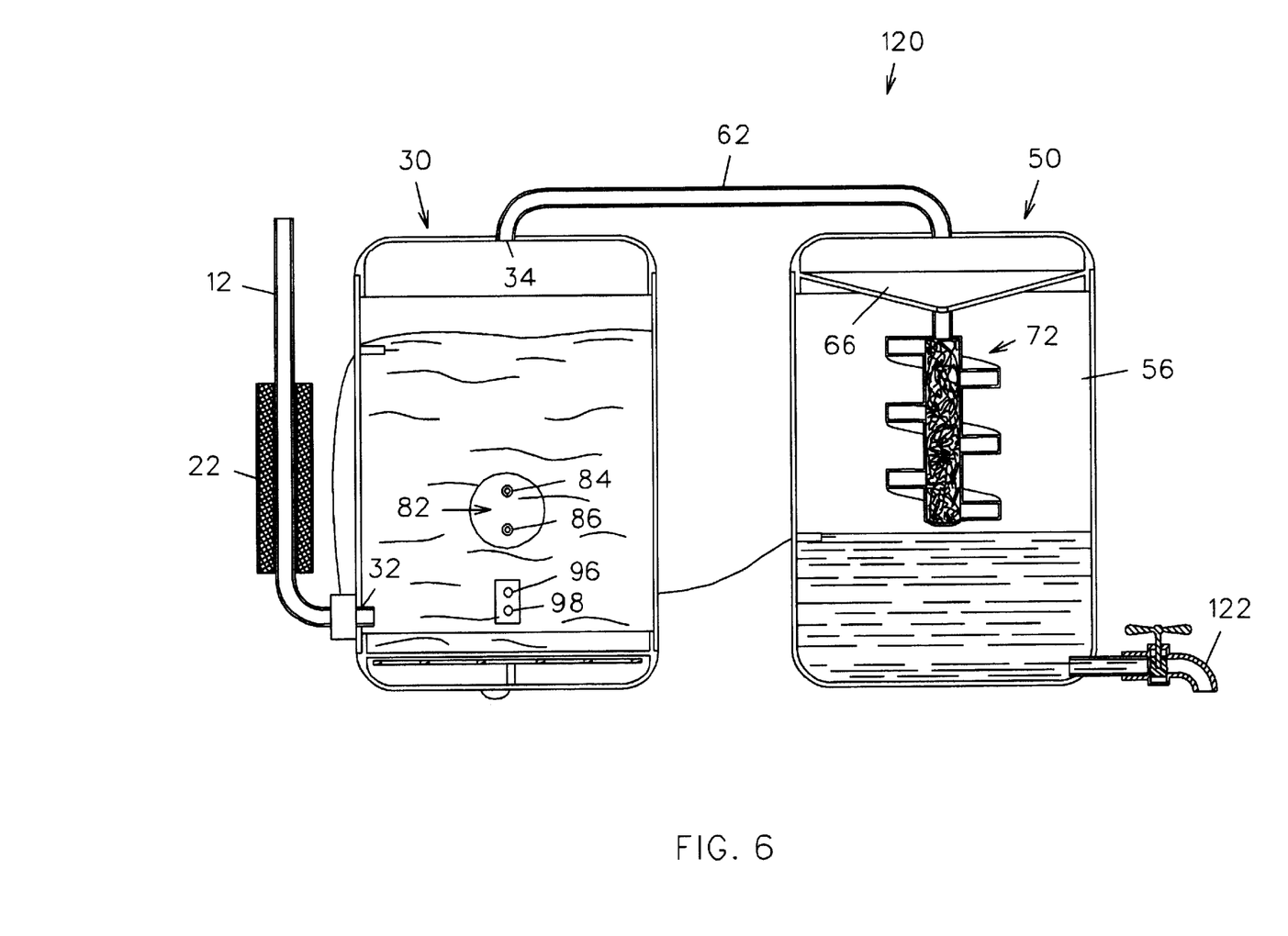
FIG. 6 is another embodiment of the sectional view of FIG. 4.

Still another embodiment of the water treatment apparatus 120 is illustrated in FIG. 6 and is substantially similar to the first embodiment described above, except as specifically noted below. In this embodiment, a third housing is not utilized. Instead, the second housing chamber 56 serves as the storage reservoir. More particularly, water drains from the helical filter 72 and accumulates in the second housing chamber 56. The second housing outlet 54 may be directly coupled to a faucet or other form of outlet spout 122.

It is understood that while certain forms of this invention have been illustrated and described, it is not limited thereto except insofar as such limitations are included in the following claims and allowable functional equivalents thereof.

What is claimed is:

1. A water treatment apparatus, comprising:
    a first housing comprising an inlet, an outlet, and a chamber intermediate said inlet and outlet, said inlet adapted for connection to an upstream pipe whereby to present a flow of water through said inlet and into said first housing chamber;
    an electrode assembly in communication with said first housing comprising:
        first and second electrodes of a copper and silver alloy extending into said first housing chamber;
        means for releasing copper and silver ions from said electrodes into said first housing chamber and the water therein to reduce bacteria levels of the water therein;
    a heating element disposed in said first housing for boiling the water in said first housing chamber;
    a second housing comprising an inlet, an outlet, and a chamber intermediate said inlet and outlet of said second housing;
    a conduit connecting said outlet of said first housing with said inlet of said second housing for supplying water vapor from said first housing chamber to said second housing chamber;
    means positioned in said second housing chamber for condensing said water vapor to form distilled water;
    an electric fan mounted in said second housing chamber and adapted to deliver cooling air to said condensing means;
    a filter assembly disposed in said second housing chamber and coupled to said condensing means for receiving said distilled water whereby to output filtered distilled water; and
    means for supplying said filtered distilled water from said filter assembly to a downstream pipe.

2. A water treatment apparatus as in claim 1 wherein said condensing means includes a funnel having an open top that spans said second housing chamber and an open bottom adapted to supply said distilled water to said filter.

3. A water treatment apparatus as in claim 1 wherein said first housing includes a second chamber adjacent said first housing chamber and partitioned therefrom, said heating element positioned in said second chamber of said first housing and separated from contact with the water in said first housing chamber.

4. A water treatment apparatus as in claim 1 wherein said filter assembly comprises:
    a tube having a helical channel, said helical channel including an inward-facing open side communicating with a central through-hole of said tube, said central through-hole being surrounded by turns of said helical channel; and
    a porous mesh-like filter disposed within said central through-hole.

5. A water treatment apparatus as in claim 1 further comprising:
    a third housing having an inlet, an outlet, and a chamber intermediate said inlet and outlet of said third housing; and
    wherein said means for supplying said filtered water from said filter assembly to the downstream pipe includes a second conduit connecting a lower end of said filter assembly with said inlet of said third housing for supplying said filtered water from said second housing chamber to said third housing chamber.

6. A water treatment apparatus as in claim 5 further comprising:
    a sensor positioned in said third housing chamber for sensing a water level therein;
    a valve coupled to said upstream pipe adjacent said inlet of said first housing, said valve being in communication with said sensor for opening fluid communication between said upstream pipe and said first housing chamber when said sensed water level is less than a predetermined water level.

7. A water treatment apparatus as in claim 1 further comprising:
    a sensor positioned in said first housing chamber for sensing a water level therein;
    a valve coupled to said upstream pipe adjacent said inlet of said first housing, said valve being in communication with said sensor for opening fluid communication between said upstream pipe and said first housing chamber when said sensed water level is less than a predetermined water level.

8. A water treatment apparatus, comprising:
    a first housing comprising an inlet, an outlet, and a chamber intermediate said inlet and outlet, said inlet adapted for connection to an upstream pipe whereby to present a flow of water through said inlet and into said first housing chamber;

magnetic means adapted to be positioned on said upstream fluid pipe for directing a magnetic field onto water flowing downstream toward said first housing inlet and into said first housing chamber whereby to magnetically treat said water;

an electrode assembly in communication with said housing comprising:
- first and second electrodes of a copper and silver alloy extending into said first housing chamber;
- means for releasing copper and silver ions from said electrodes into said first housing chamber and the water therein to reduce bacteria levels of the water in said first housing chamber;

a heating coil disposed in said first housing for boiling the water in said first housing chamber;

a second housing comprising an inlet, an outlet, and a chamber between said inlet and outlet of said second housing;

a conduit connecting said outlet of said first housing with said inlet of said second housing for supplying water vapor from said first housing chamber to said second housing chamber;

means positioned in said second housing chamber for condensing said water vapor to form distilled water;

an electric fan mounted in said second housing chamber and adapted to deliver cooling air to said condensing means;

a filter assembly disposed in said second housing chamber and coupled to said condensing means for receiving said distilled water whereby to output filtered distilled water; and means for supplying said filtered distilled water from said filter assembly to a downstream pipe.

9. A water treatment apparatus as in claim 8 wherein said condensing means includes a funnel having an open top that spans said second housing chamber and an open bottom adapted to supply said distilled water to said filter.

10. A water treatment apparatus as in claim 8 wherein said filter assembly comprises:
- a tube having a helical channel, said helical channel including an inward-facing open side communicating with a central through-hole of said tube, said central through-hole being surrounded by turns of said helical channel; and
- a porous mesh-like filter disposed within said central through-hole.

11. A water treatment apparatus as in claim 8 further comprising:
- a sensor positioned in said first housing chamber for sensing a water level therein;
- a valve coupled to said upstream pipe adjacent said inlet of said first housing, said valve being in communication with said sensor for opening fluid communication between said upstream pipe and said first housing chamber when said sensed water level is less than a predetermined water level.

* * * * *